United States Patent [19]

Furuya

[11] Patent Number: 5,818,639

[45] Date of Patent: Oct. 6, 1998

[54] MULTISCREEN DISPLAYING APPARATUS AND SCREEN FITTING STRUCTURE

[75] Inventor: Keizo Furuya, Saitama-ken, Japan

[73] Assignee: Kabushiki Kaisha Toshiba, Kawasaki, Japan

[21] Appl. No.: 716,991

[22] Filed: Sep. 20, 1996

[30] Foreign Application Priority Data

Sep. 21, 1995 [JP] Japan .................................... 7-243187
Mar. 5, 1996 [JP] Japan .................................... 8-047470

[51] Int. Cl.$^6$ ............................................. G03B 21/00
[52] U.S. Cl. ........................ 359/455; 359/460; 348/836
[58] Field of Search .................... 359/455–457, 359/460; 348/836, 839, 840

[56] References Cited

U.S. PATENT DOCUMENTS

| | | | |
|---|---|---|---|
| 5,011,277 | 4/1991 | Ogino et al. | 353/94 |
| 5,085,495 | 2/1992 | Iwahara et al. | 359/455 |
| 5,185,677 | 2/1993 | Honda et al. | 359/460 |
| 5,249,005 | 9/1993 | Furuno | 353/94 |
| 5,382,990 | 1/1995 | Hata et al. | 353/94 |
| 5,580,185 | 12/1996 | Yamada et al. | 353/74 |
| 5,604,632 | 2/1997 | Sawai | 359/443 |

FOREIGN PATENT DOCUMENTS 7-270914  10/1995  Japan .
8-122918  5/1996  Japan .

*Primary Examiner*—Daniel P. Malley
*Attorney, Agent, or Firm*—Cushman Darby & Cushman IP Group of Pillsbury Madison & Sutro

[57] ABSTRACT

In the structure of a multiscreen displaying apparatus, a set of units 20 is formed by piling unit displays 21A and 21B so that Fresnel lenses 23A and 23B are vertically arranged. One lenticular lens 10 is installed on the front of the Fresnel lenses 23A and 23B of each unit. Then protruded jaw parts 11 are provided at the upper and lower ends of the lenticular lens 10, and the lenticular lens 10 covers the Fresnel lenses 23A and 23B by hanging the jaw part 11 on the outer side of screen fitting frames 22A and 22B. Furthermore, in order to obtain vertical tension, a leaf spring 15 or the like is inserted between the jaw part 11 and the fitting frames 22A and 22B (hanging parts). It is possible to form a stereoscope by arranging plural units 20. Furthermore, the screen fitting structure of the projection units is that a casing type fitting frame 70 is installed on the side of the back of a screen 60. Metal fittings 81 for supporting is fixed to an inclined part 72 of a fitting frame 70 by screws 82. Fixing pieces 61 provided at the ends of a screen 60 are supported by the metal fittings 81 for supporting and the screen 60 is held between an engaging part 71 of the fitting frame 70 and the metal fittings 81 for supporting. By applying force in the direction of pushing out the screen 60 except the vertical direction at the inclined parts 72 and 81B, the screen 60 is held securely.

20 Claims, 17 Drawing Sheets

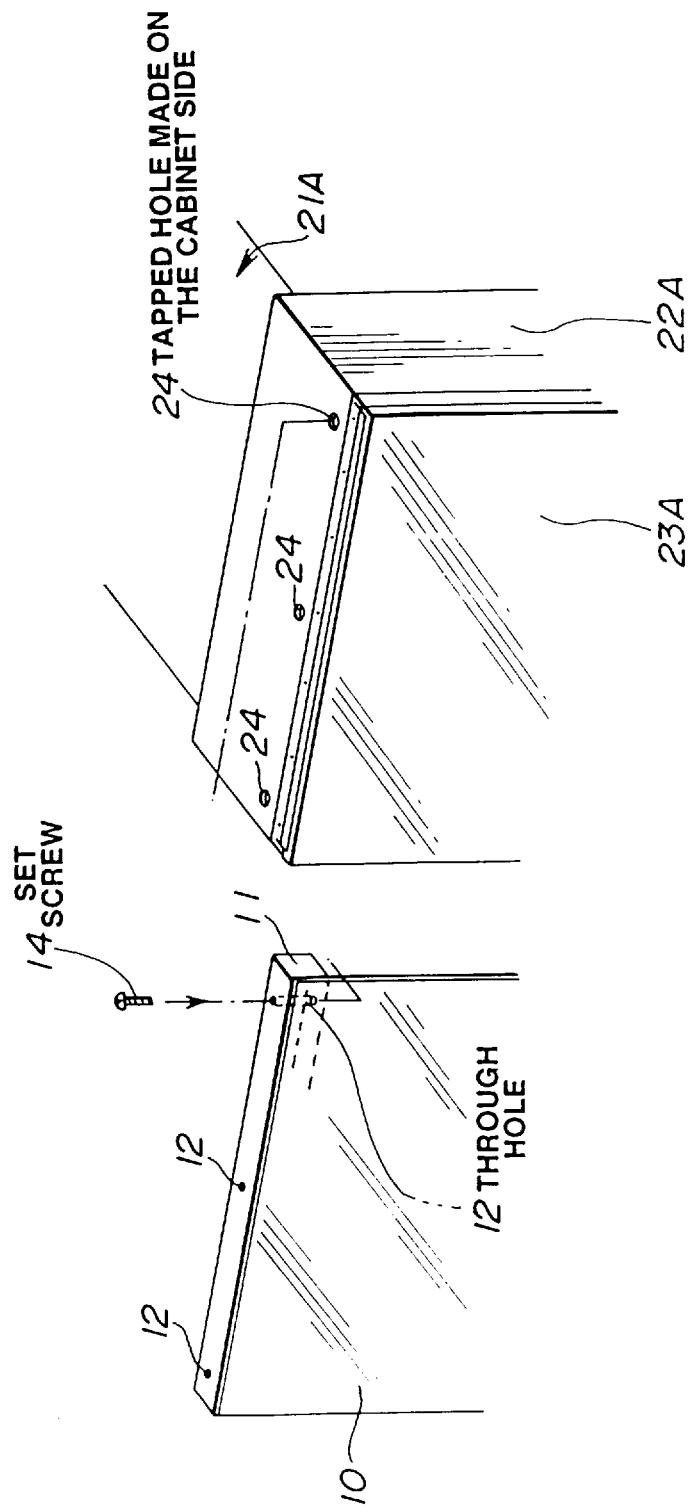

$d_2 < d_1 < D_2$ $D_1 < a_2 < a_1$

MINOR DIAMETER OF THE SHOULDER BOLT

10e, A SMALL HOLE MADE AT A PLACE CLOSE TO THE EDGE

40 THIN ADHESIVE TAPE 23A    22

SAME HEIGHT 40    22

23A

MULTISCREEN DISPLAYING APPARATUS AND SCREEN FITTING STRUCTURE

BACKGROUND OF THE INVENTION

1. Field of the Invention

The present invention relates to a multiscreen displaying apparatus and to a screen fitting structure used for a projection unit using a transparent screen. The apparatus can be configured and arranged to create a stereoscope.

2. Description of the Related Art

A multiscreen display is formed by vertically and horizontally arranging plural unit displays to obtain a large screen. FIG. 18 shows a conventional multiscreen display. FIG. 18 illustrates a multiscreen display consisting of six unit displays. FIG. 19 shows a joint part of a lenticular lens 100 of FIG. 18.

As shown in FIG. 18, a large screen consisting of six unit displays is formed by arranging display units on top of one another. Each unit display 210 is provided with a cabinet 220 in which an optical system (not shown) is located and a Fresnel lens 230 on which an image is enlarged and projected by the optical system. The Fresnel lens 230 is held by metal fittings and a screen fitting frame, for example. Furthermore, as shown in FIG. 18, a multiscreen displaying apparatus is formed by covering unit displays 210 with a lenticular lens 100 to make the joint part small.

In such a multiscreen displaying apparatus, the lenticular lens 100 having a large flat surface as shown in FIG. 18 must be properly constructed. Constructing this lenticular lens 100 requires a technique of bonding and jointing longitudinal lenticular lenses. For example, in case of the arrangement shown in FIG. 18, it is necessary to bond three lenticular lenses in the horizontal direction having a height twice that of the Fresnel lenses 230. The lenticular lens 100 is about 1 mm thick, as shown in FIG. 19, and the cross section of it has a complex corrugated form. The technique used to horizontally bond them is very expensive.

Furthermore, if the Fresnel lenses 230 and the lenticular lenses 100 are not bonded closely together, it will be impossible to obtain a desired lens effect. A clear image will not be obtained and/or the image will be distorted. Therefore tension is applied to stretch the lenticular lenses 100. Force is applied in the outer direction of the lenticular lenses 100 to eliminate space between the Fresnel lenses 230 and the lenticular lenses 100 and to obtain a large flat surface.

For example, a screen structure in which the lenticular lenses 100 are fixed by applying tension is disclosed in Patent Application No. Heisei 6-260714 (Japanese Patent Laid-open No. 122918/1996) which the applicant of the present invention applied for the Japanese Patent Office on Oct. 25, 1994.

In FIG. 20, a first fitting frame 910 is placed on the back side of a screen 300. A second fitting frame 920 surrounds the outer periphery of the screen 300. The second fitting frame 920 is provided with an engaging part 921 to engage one side of the screen 300. While the lower end of a fixing piece 310 provided at the upper part of the screen 300 is held by a holding member 930, another holding member 940 is hung on the upper end of a fixing piece 320 provided at the lower part of the screen 300. In addition, a spring 924 and a screw 923 are provided between a bottom face 920A of the second fitting frame 920 and the holding member 940. It is possible to adjust the position of the lower end of the screen 300 together with the holding member 940 and the fixing piece 320 by turning the screw 923 in and out. The screen 300 is thereby held with tension being applied thereto in the vertical direction.

With the construction as shown in FIG. 20, it is possible to apply a uniform tension to the screen 300 by the holding member 930 provided at the upper end and the holding member 940 provided at the lower end. This is because a uniform tension can be applied to the screen 300 at the end surface of the holding member 940 by placing a spring 924 in the holding member 940.

Even though the structure according to Patent Application No. Heisei 6-260714 (Japanese Patent Laid-open No. 122918/1996) is suitable as an attaching structure for large-sized screen, it is too complex for attaching a middle-sized screen. Since it is lacking in simplicity and operability for attaching a middle-sized screen, further improvement is required.

SUMMARY OF THE INVENTION

The present invention is a multiscreen displaying apparatus with a plurality of display units to be arranged adjacent to one another. A Fresnel lens is mounted on a front side of each display unit. A lenticular lens is placed in covering relation with respect to the Fresnel lenses. A jaw part is at upper and lower ends of the lenticular lens. The jaw part is attached to the upper and lower ends of the set of display units. Springs are inserted between the jaw part and the upper or lower end of the units. Tension is applied vertically to said lenticular lens by the springs.

Another aspect of the present invention is a multiscreen displaying apparatus in which a plurality of display units are arranged. The multiscreen displaying apparatus comprises a Fresnel lens mounted on a front of each display unit. A lenticular lens is placed in covering relation with the Fresnel lenses. A plurality of black stripes are provided on the front of the lenticular lens and placed continuously from one end to the other end of the lenticular lens to partially shield external light. Thus it is possible to prevent the light from being reflected irregularly on the end of each unit and to make the joint between each set of units unnoticeable.

A third aspect according to the present invention is a screen fitting structure for a display unit in which a screen is placed at a predetermined interval from the unit and the light of an image from said projecting unit is enlarged and projected on the front of said screen. The screen fitting structure comprises a casing type fitting frame attached to the outer periphery of said screen. A supporting element for attaching the screen to the fitting frame applies tension in a first direction toward the outer periphery of the screen. A holding element including a position controlling means for controlling an attaching position of said screen to said fitting frame attaches the screen to the fitting frame by applying tension in a direction opposite to said first direction.

BRIEF DESCRIPTION OF THE DRAWINGS

FIG. 2(*a*) is an enlarged view of the upper end of a lenticular lens of FIG. 1.

FIG. 2(*b*) is an enlarged view of the upper end on the side of the cabinet of FIG. 1.

DETAILED DESCRIPTION OF THE PREFERRED EMBODIMENTS

Figure 1:
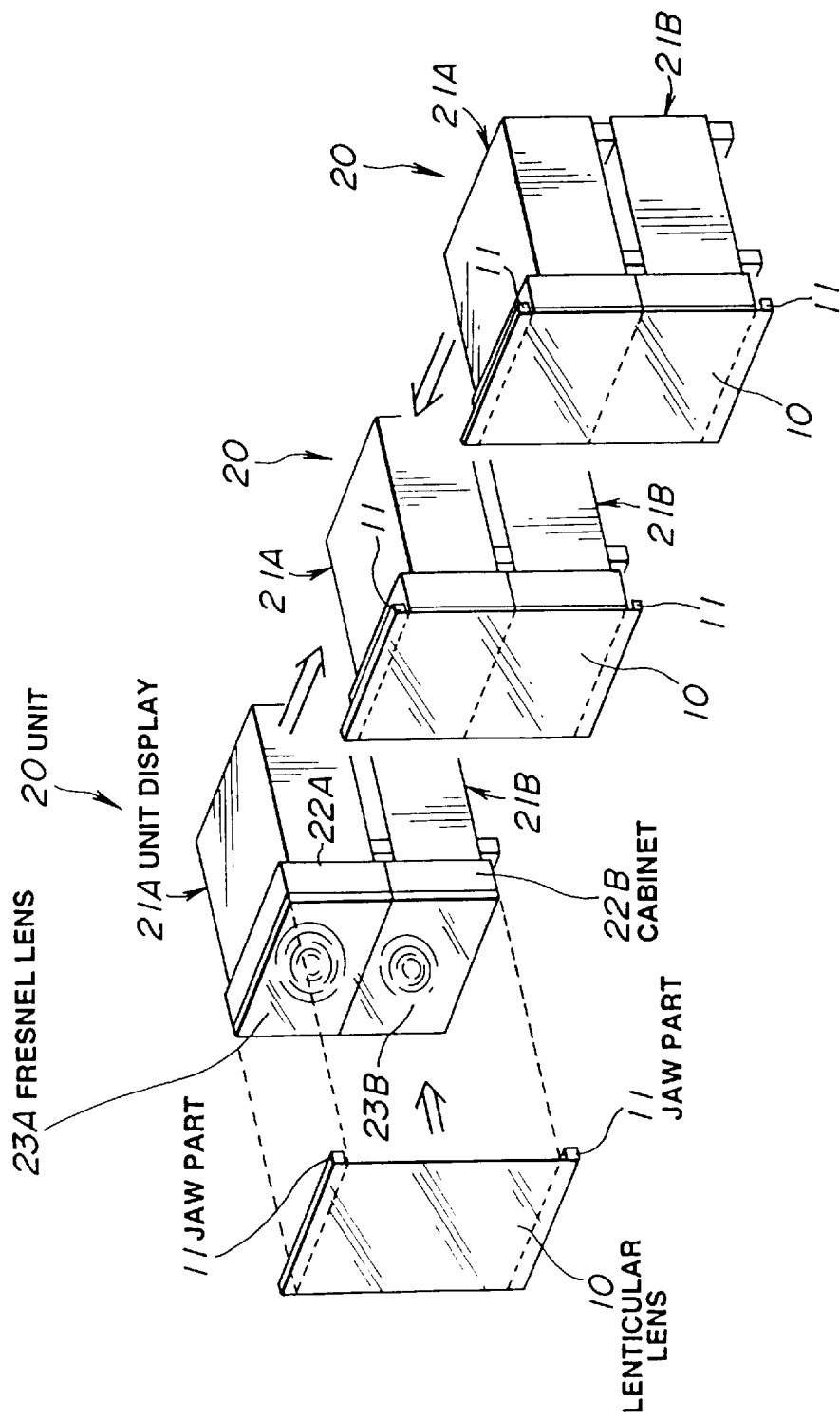
FIG. 1 is an exploded perspective view showing a multiscreen displaying apparatus according to the present invention.

FIG. 1 is a view showing a multiscreen display and a screen fitting structure of an embodiment according to the present invention.

As shown in FIG. 1, two display units 21A and 21B are stacked to define a set of display units 20. A lenticular lens 10 is provided to cover Fresnel lenses 23A and 23B of the display units 21A and 21B. The lenticular lens 10 forms a screen with the Fresnel lenses 23A and 23B. The size of the lenticular lens 10 is larger than that of the set of display units 20 and jaw parts 11 are bonded to the inner surfaces of the upper and lower ends of the lens 10. The jaw parts 11 are components of a holding device. The jaw parts 11 are mounted on the upper and lower ends of the cabinet of the set of display units 20, and the lenticular lens 10 is held with an application of tension. The holding device consists of jaw part 11 and the outer parts of the display units 21A and 21B. Reference numbers 22A and 22B refer to the cabinets of the display units 21A and 21B respectively. The jaw parts 11 consist of, for example, metal materials or resin materials having suitable strength.

The holding device consisting of the jaw parts 11 provided on the lenticular lens 10 and the cabinets of the display units 21A and 21B are described in detail referring to FIGS. 2(a) and 2(b). The jaw part 11 is bonded to both sides of the lenticular lens 10. In FIGS. 2(a) and (b), only the jaw part 11 on the upper side is shown. The jaw part 11 is provided with through holes 12. Internal threads 24 are provided at positions corresponding to the through holes 12 on the side of the cabinet 22A. Screws 14 penetrate the through holes 12 and engage the internal threads. With such a construction, the lenticular lens 10 can be held by mounting the jaw parts 11 on the upper and lower sides of the cabinet 22A to thereby apply tension to the lenticular lens 10.

Figure 3A:
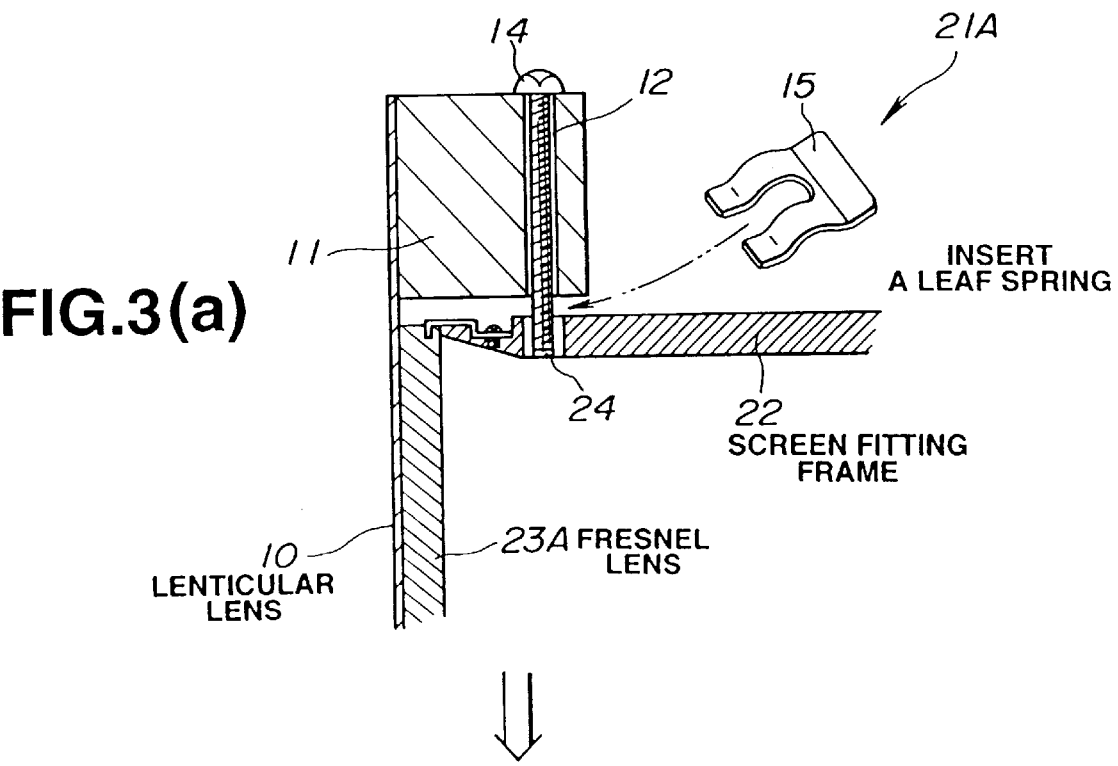
FIGS. 3(*a*) and 3(*b*) are views showing the detailed structure of the jaw part at the upper end and a part on the side of the cabinet in FIG. 2.

FIGS. 3(a) and (b) show the attachment of the jaw part 11 to the cabinet 22A. The upper end of the lenticular lens 10 extends outwardly beyond the edge of the Fresnel lens 23A. The jaw part 11 is bonded to the back of the extended portion of the lens. The jaw part 11 is attached to the side of the cabinet, that is, the outside of a fitting frame 22 of the Fresnel lens by the screw 14.

Figure 3B:
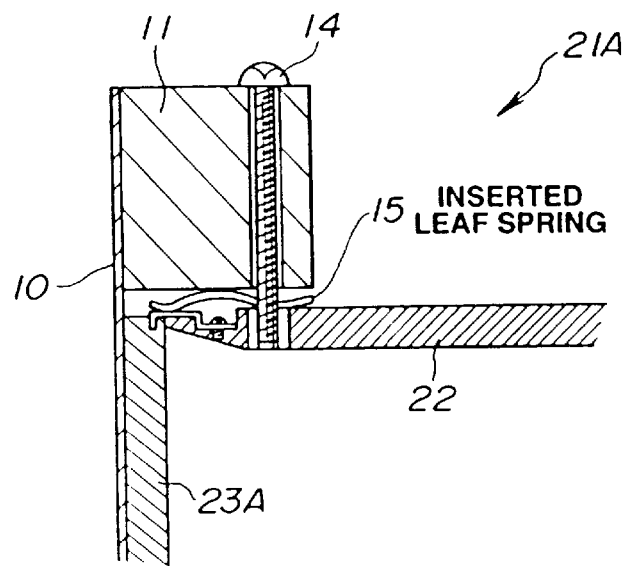

A leaf spring 15 is inserted between the jaw part 11 and the fitting frame 22. FIG. 3(a) shows the apparatus before the leaf spring 15 is inserted and FIG. 3(b) shows the leaf spring 15 mounts in place. By inserting the leaf spring 15 into the gap between the jaw part 11 and the fitting frame 22 of the Fresnel lens 23A, the jaw part 11 is biased upward to apply tension to the lenticular lens 10. The position of the screw 14 is adjustable and it is possible to adjust the tension according to the position of the screw. Therefore, it is possible to apply a proper tension to the lenticular lens 10 even when the lenticular lens expands or retracts due to temperature change. Though not shown, the jaw part 11 at the lower end of the lenticular lens 10 has a similar construction and is attached to the lower end of the cabinet 22B. Alternatively, a weight may be hung on the jaw part 11 at the lower side of the lenticular lens 10 to pull down the lenticular lens 10 by gravity.

Figure 4A:
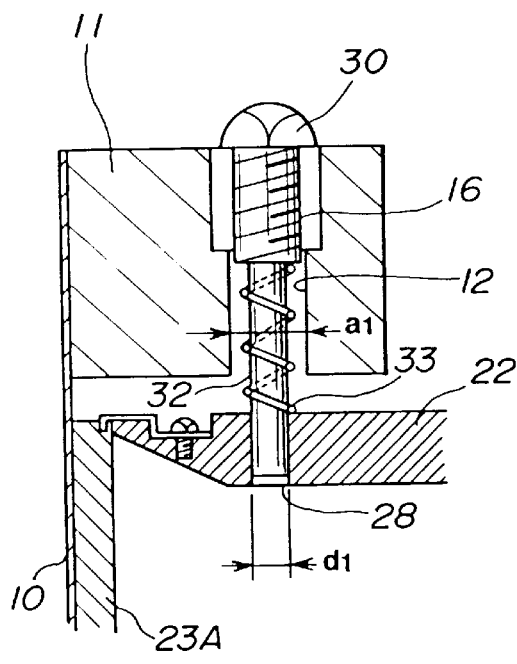
FIGS. 4(*a*) and 4(*b*) are views showing another structure of the jaw part at the upper end and a part on the side of the cabinet in FIG. 2.

Furthermore, FIGS. 4(a) and (b) show an embodiment in which a coil spring 33 is used instead of the leaf spring. Though FIGS. 4(a) and (b) show only the upper part of the lenticular lens 11, the lower part has a similar construction.

Figure 4B:
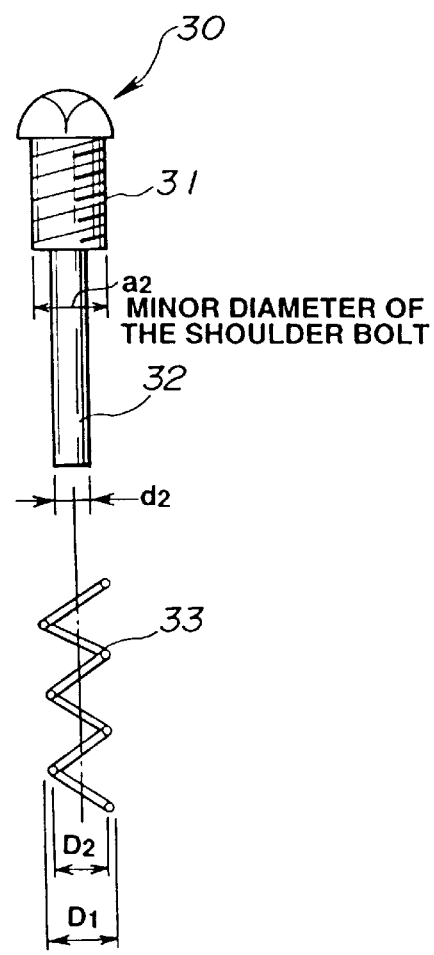

As shown in FIG. 4(a), an internal thread 16 is provided at the upper part of the jaw part 11 so that the screw 30 is engaged with this internal thread 16. The jaw part 11 is provided with a through hole 12 adjacent to the internal thread 16. The screw 30 is formed as a stepped bolt and, as shown in FIG. 4(b), consists of an external thread part 31 and a cylindrical part 32 protruded from the external thread part 31. The external thread part 31 is engaged with the internal thread part 16 with which the jaw part 11 is provided. The cylindrical part 32 is engaged with a hole 28 formed on the fitting frame 22. The hole 28 guides the screw 30 and controls the positions of the Fresnel lens 23A and the lenticular lens 10. Furthermore, a coil spring 33 is wound on the cylindrical part 32 and applies tension in the vertical direction of the lenticular lens 10 in a manner similar to the leaf spring 15. Furthermore, it is possible to adjust the tension corresponding to the degree of insertion of the screw 30 in a manner similar to the leaf spring 15.

In FIGS. 4(a) and (b), the various components are provided with the minor diameter of the screw part 31 being a2, the inner diameter of the through hole 12 being a1 and the inner diameter of the hole 28 being d1. It is shown that the positions of the lenticular lens 10 and the Fresnel lens 23A are regulated by controlling the inner diameter of the hole 28 to the tolerance of fitting to the cylindrical part 32 and the end of the spring 33 is supported by the fitting frame 22 by making the inner diameter d1 of the hole 28 smaller than the inner diameter D2 of the spring 33. Furthermore, it is shown that, by making the outer D1 of the spring 33 smaller than the minor diameter a2 of the screw 30 so that pressure is applied to the spring 33, the bottom surface of the screw functions as a pressing part to apply pressure properly to the spring 33.

Therefore, with the construction as shown in FIG. 4(a), it is possible to adjust tension by adjusting the degree of insertion of the screw 30 and to control the position of the lenticular lens 10 and the Fresnel lens 23A by the position of the hole 28.

As a variation, the function of the screw 30 may be performed by two different parts. That is, one screw presses the spring 33 and the other screw engages the fitting frame 22 and the lenticular lens 10 to position them. A plurality of these screws are arranged in well balanced positions so that an effect equivalent to that described above may be obtained. Thus, it is also possible to form an equivalent structure with conventional screws without using a special screw such as the screw 30.

Figure 5:
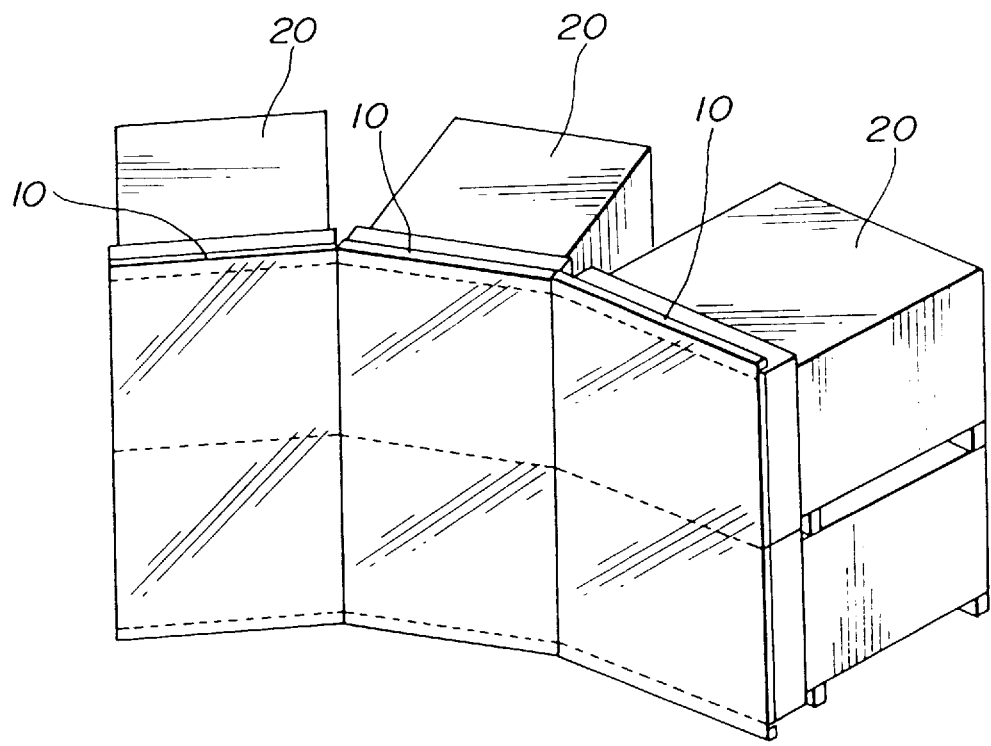
FIG. 5 is a view of a stereoscope formed by arranging the units of FIG. 1.

According to the present invention, it is possible to form a stereoscope by arranging a number of sets of units 20 in a circular arc form, as shown in FIG. 5.

Figure 18:
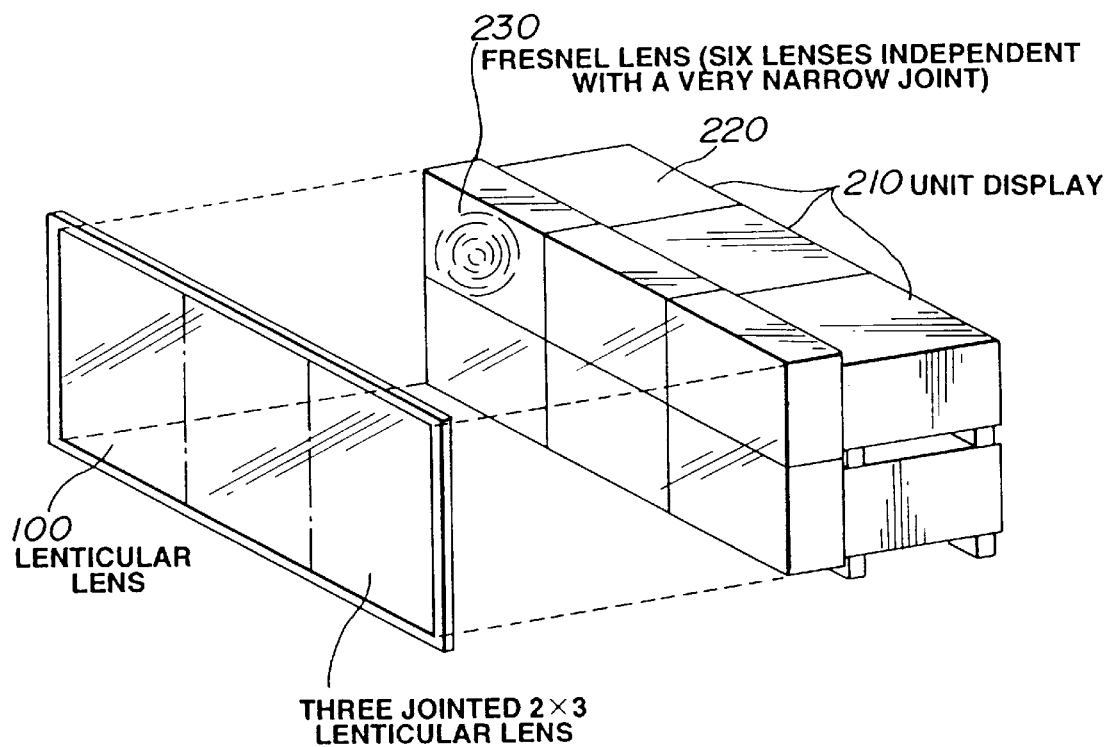
FIG. 18 is a sketch drawing of a conventional multiscreen display.
Figure 19:
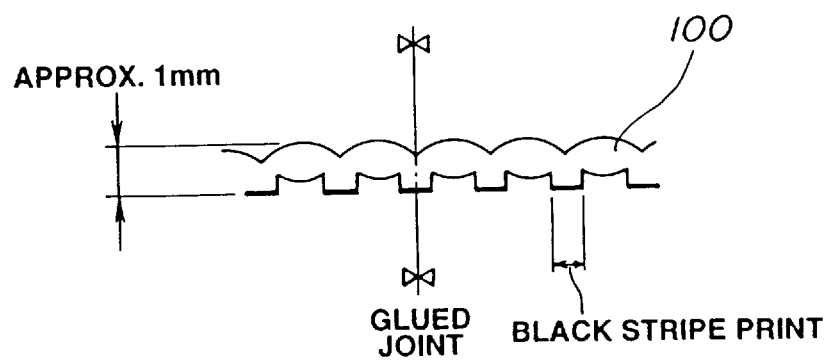
FIG. 19 is a view showing a lenticular lens part of FIG. 18.
Figure 20:
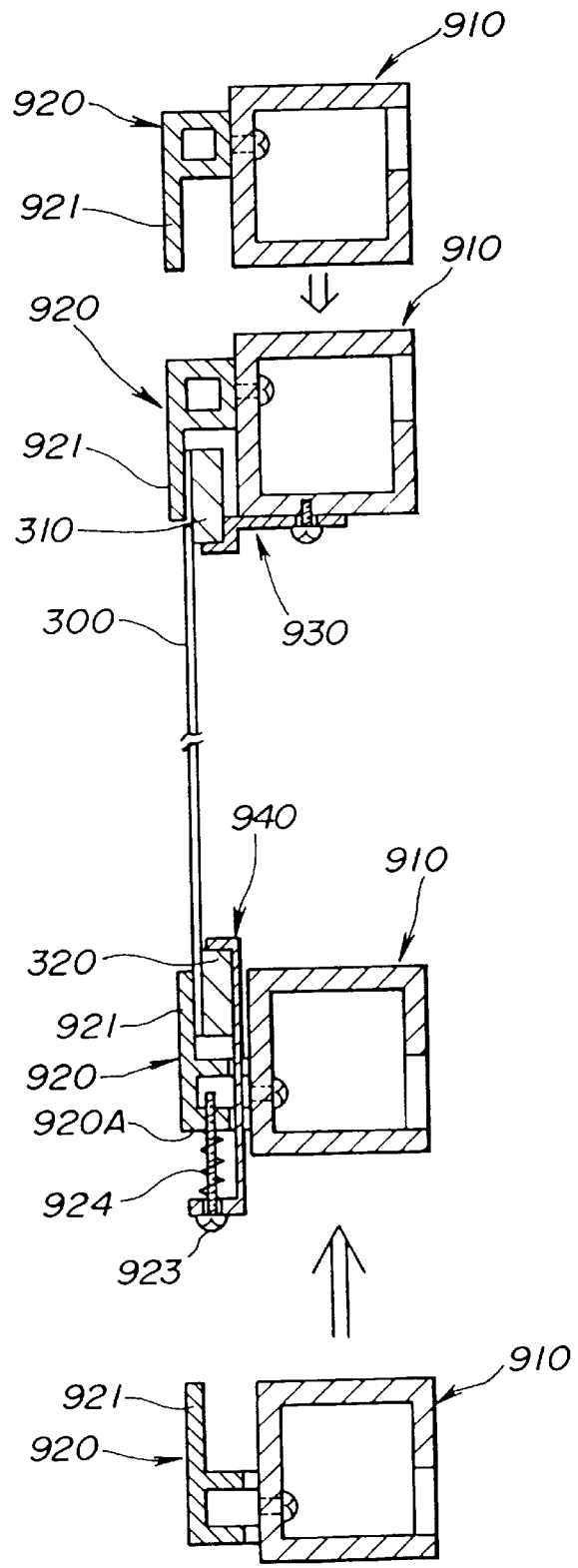
FIG. 20 is a view showing an attaching structure of a conventional screen for a large-sized projection unit.

Though the double Fresnel lenses 23A and 23B arranged in the vertical direction are described as a unit 20, it is possible to form the triple or quadruple Fresnel lenses arranged in the vertical direction. Furthermore, of course it is possible to form double or triple Fresnel lenses arranged in the horizontal direction. In addition, it is possible to use a small-sized lenticular lens 10 in the present invention rather than a conventional large-sized lenticular lens 100 (see FIG. 18), thereby reducing labor and transportation problems and eliminating problems encountered with respect to the size of the entrance of building.

Figure 6:
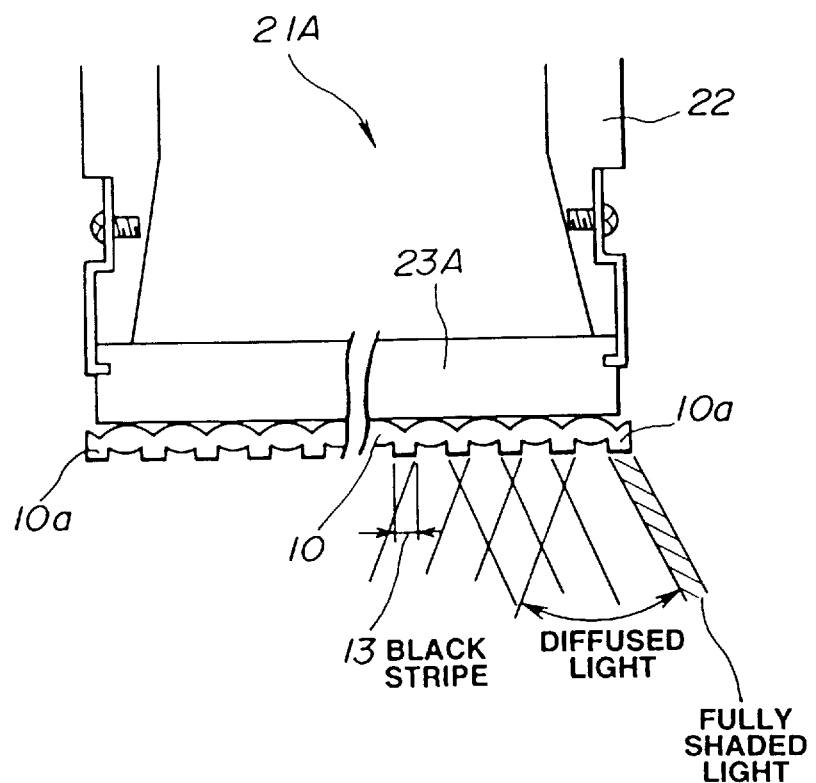
FIG. 6 is a view showing the structure of black stripes with which a lenticular lens is provided.

In FIG. 6, the placement of the black stripes on the lenticular lens 10 secures the quality of pictures at both ends of the stereoscope and functions at the same time to eliminate degradation of the quality of the picture due to the joint formed between the sets of display units 20. In FIG. 6, the black stripes 13 are positioned at the end 10a of the lenticular lens 10 to prevent irregular reflections from occurring at this part and to partially shield the screen from light from the outside. Particularly, as mentioned above, since it is possible to reduce interference between each set of display units in the stereoscope and to secure the quality of picture at the joint part through the use of the black stripes 13 a clearer image can be obtained.

Figure 7A:
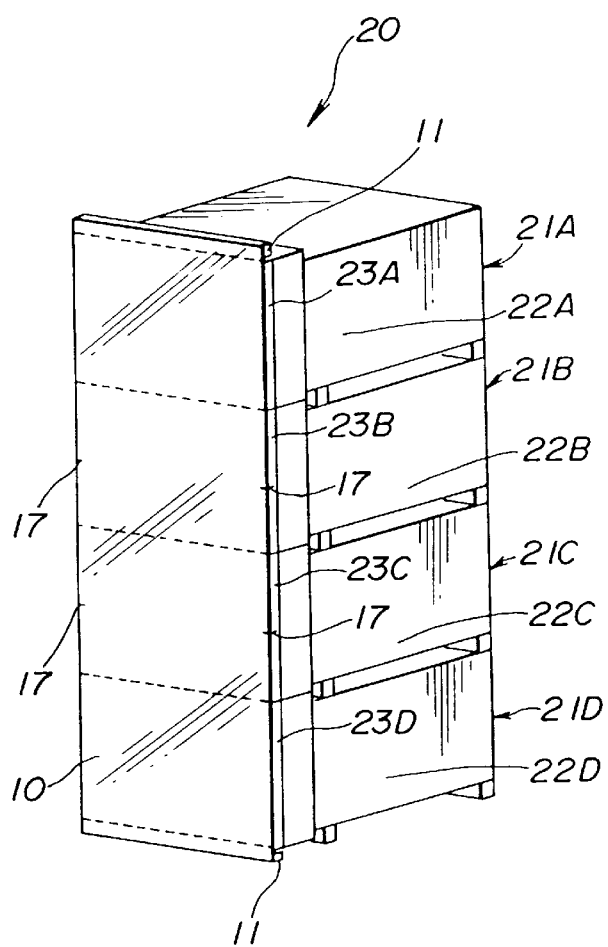
FIG. 7(a) is a view in which a unit consists of quadruple unit displays.
Figure 7B:
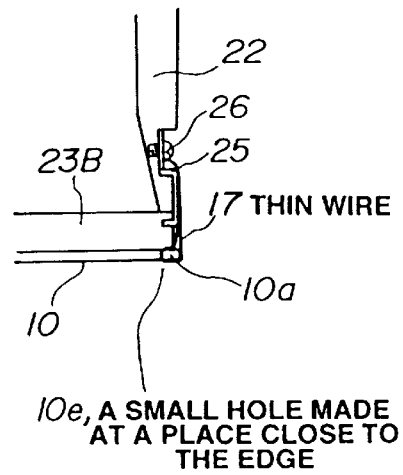
FIG. 7(b) is an enlarged view of a structure to prevent the lenticular lens of FIG. 7(a) from being loosened.

In an arrangement where triple or quadruple Fresnel lenses are arranged in the vertical direction, there is a possibility that the left and right ends 10a of the lenticular lens 10a may become loosened. FIG. 7(a) and (b) show an embodiment provided to eliminate this problem. FIG. 7(a) is a perspective view showing set of display units 20 having four Fresnel lenses arranged in the vertical direction. A thin wire 17 is passed through hole 10e provided on the edge of the lens 10 and fired to the frame 22 by a screw 26. The left and right ends 10a of the lenticular lens 10 are fixed by the wires 17 to prevent the lenticular lens 10 from being loosened. It should be noted that screw 26 also fired metal fitting 25. FIG. 7(b) is a cross section view at the part of wire 17 of FIG. 7(a).

Figure 8:
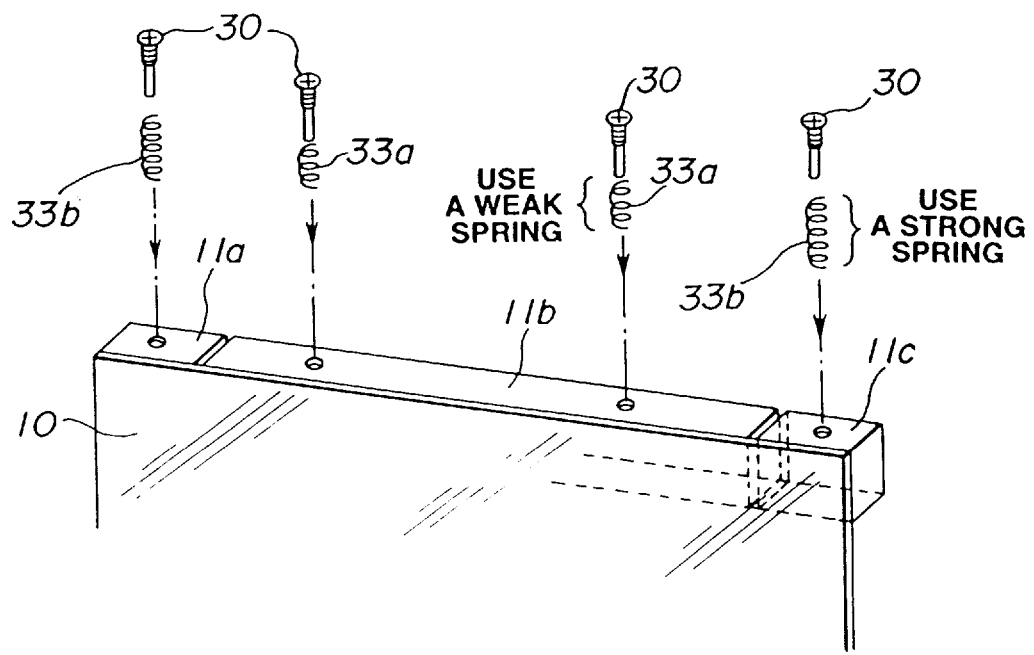
FIG. 8 is a view of a different embodiment of the structure of FIG. 2.

Furthermore, FIG. 8 is a variation in which it is possible to further obtain tension in the horizontal direction of the lenticular lens even in case where Fresnel lenses are arranged in the vertical direction as shown in FIG. 1. The arrangement shown in FIG. 8 is a variation of the embodiment in which the spring 33 of FIG. 4 is used. The jaw part is divided into three parts 11a, 11b and 11c. The central jaw part 11b is the longest and has a length extending along a longitudinal direction thereof. 11a and 11c have a length shorter than the length of the central jaw part. Furthermore, strong springs 33b having a relatively high spring constant are used in conjunction with both outer jaw parts 11a, 11c and a weak spring 33a having a relatively weak spring constant is used at the center jaw part 11b. As a result of using springs with different spring constants, difference of tension is obtained. Because it is necessary to prevent waving phenomenon in the horizontal direction of the lenticular lens 10, the center jaw part 11b has a greater length than the outer jaw parts 11a, 11c. As both sides 11a and 11b is influenced by temperature by temperature and/or humidity more apparently than the central part 11b, the tension differs between the central part 11b and both sides 11a and 11b. This arrangement applies uniform tension in accordance with this difference.

Figure 9:
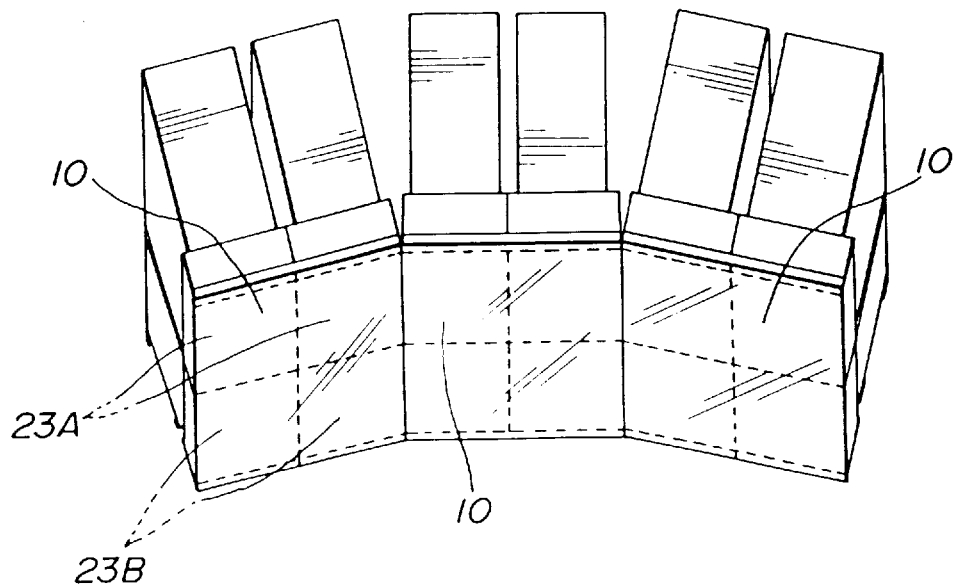
FIG. 9 is another embodiment of the structure of a multiscreen displaying apparatus.

FIG. 9 illustrates a stereoscope that is easily formed by arranging three sets of display units 20 in the horizontal direction. Each set of units 20 has two display units each having a Fresnel lens 23A, 23B.

Figure 10:
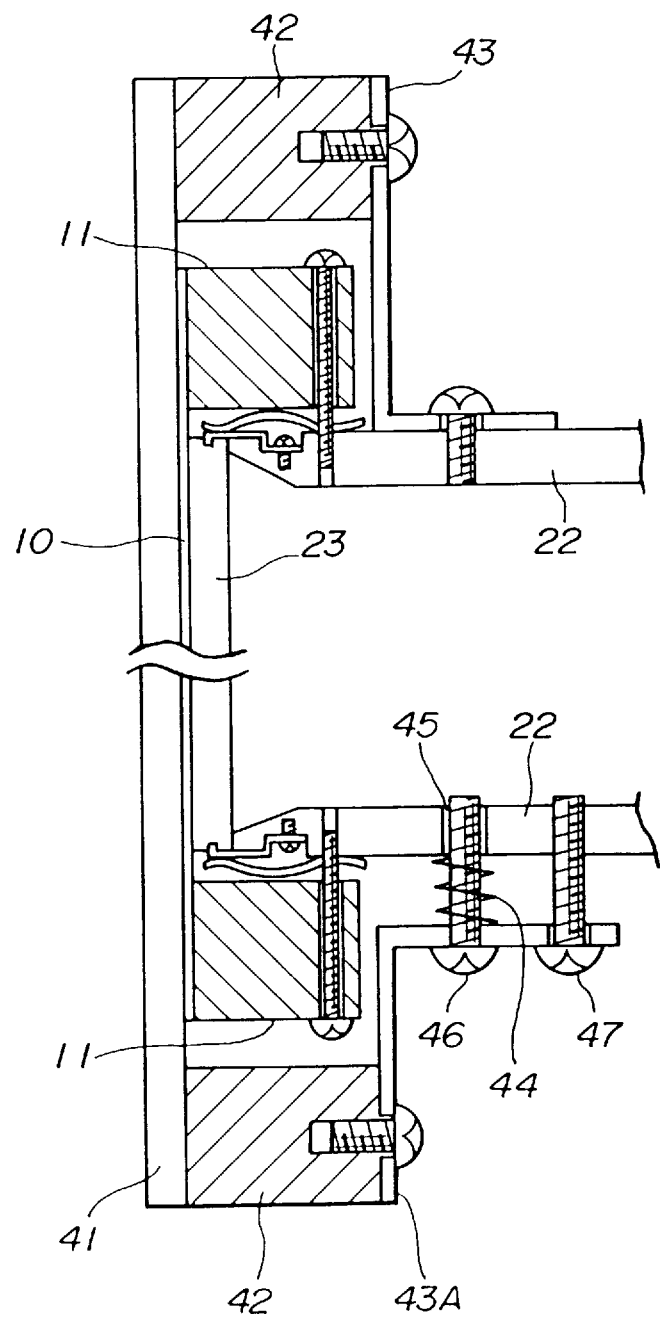
FIG. 10 is a view showing the structure in which a protective layer is provided on the front of a lenticular lens.

FIG. 10 illustrates a protective layer 41 on the front of the lenticular lens 10. The protective layer 41 is made of an acrylic plate. The protective layer 41 is mounted along with the holding device of the lenticular lens 10. As the whole surface of lenticular lens 10 is pressed from the front by the protective layer 41, the lenticular lens 10 is prevented from becoming loosened. In such an arrangement the lenticular lens 10 can be pressed against the side of the Fresnel lens 23 without using a spring due to hardness of the acrylic plate itself (the acrylic plate is thicker than 3 mm and is much thicker than 1 mm of the lenticular lens). Of course, it is also contemplated that a spring may be used in conjunction with the protective layer 41.

A device to hold the acrylic plate 41 is formed similarly to the holding device of the lenticular lens 10. As such, a jaw part 41 is provided with angled metal fittings 43 and 43A to be fixed to a cabinet. As shown in FIG. 10, the upper part of the protective layer 41 is fixed by screws fitting frame 22. Though the angled metal fittings 43 are fixed to the cabinet at the upper part, the lower part is constructed so that the tension is applied to the protective layer. An internal thread is provided corresponding to the angled metal fittings 43A. A fitting frame 22 is provided with a through hole 45 and the metal fittings 43A are attached to the fitting frame 22 by a screw 46. A second screw 47 is provided for fixing the metal fittings 43A. The fitting frame 22 is provided with an internal thread and the metal fittings 43A is fixed to the fitting frame 22 by the screw 47. Furthermore, a spring 44 is mounted with respect to the screw 46. It is possible to vary the effect of the spring 44 by positioning the screw 46 closer to or further away from the front of the fitting frame 22.

With such a construction, it is possible to apply proper tension to the lenticular lens 10. Instead of the structure of FIG. 10, a weight may be hung up on the jaw part 42 at the lower part to pull the lenticular lens downward.

In order to cover plural display units with a lenticular lens 10, it is necessary to minimize the joint part of the display units. Here, an attaching part of a Fresnel lens 23A is improved by using an adhesive tape as shown in FIG. 11(a).

Figure 11A:
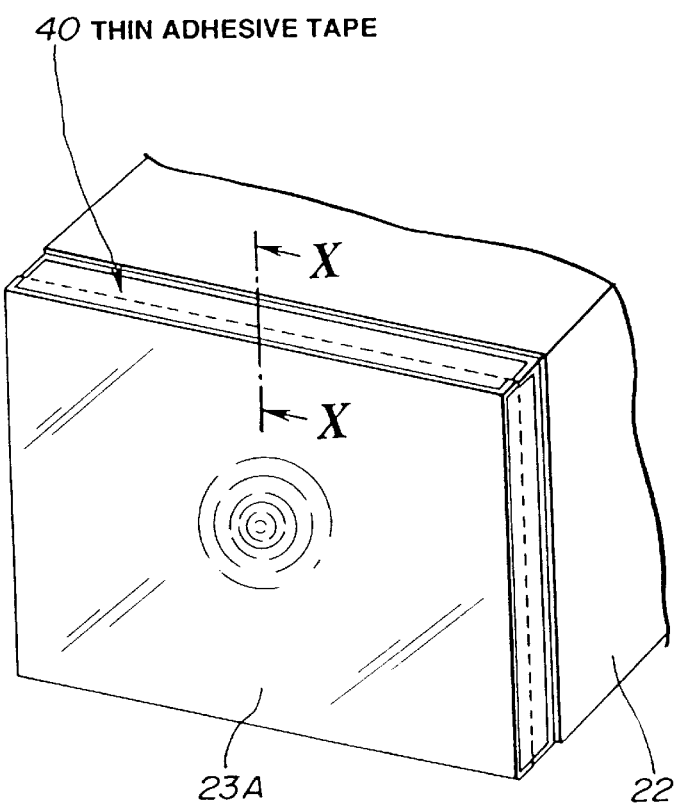
FIG. 11(a) is a view showing an attaching part of a Fresnel lens of a unit display.
Figure 11B:
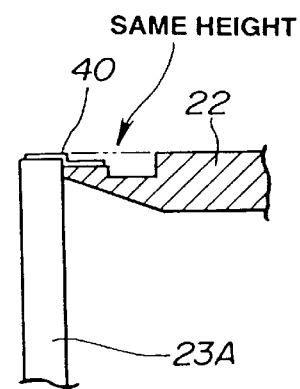
FIG. 11(b) is a cross section view taken along a line X—X of FIG. 11(a).

In FIG. 11(a), because the Fresnel lens 23A is much thicker than the lenticular lens 10, an adhesive tape 40 is used to press it instead of metal fittings. Because the Fresnel lens 23A is harder than the lenticular lens 10, the Fresnel lens 23A is not loosened even when little tension is applied.

As shown in FIG. 11(a), the outer periphery of the Fresnel lens 23A and the fitting frame (on the side of a cabinet) 22 are connected with adhesive tape 40. In order to make the height of the fitting frame 22 and that of the outer periphery of the Fresnel lens 23A almost the same, they are connected with extremely thin tape. Thus, it is possible to control the position of the Fresnel lens 23A and to hold it with adhesive tape 40 without using metal fittings. Furthermore, with such an arrangement, the thickness of the joint part is only that of two tapes at most. Therefore, it is possible to make the joint extremely small. Furthermore, as it is necessary to process the Fresnel lens 23A, the construction of the Fresnel lens 23A itself becomes simple.

Figure 12:
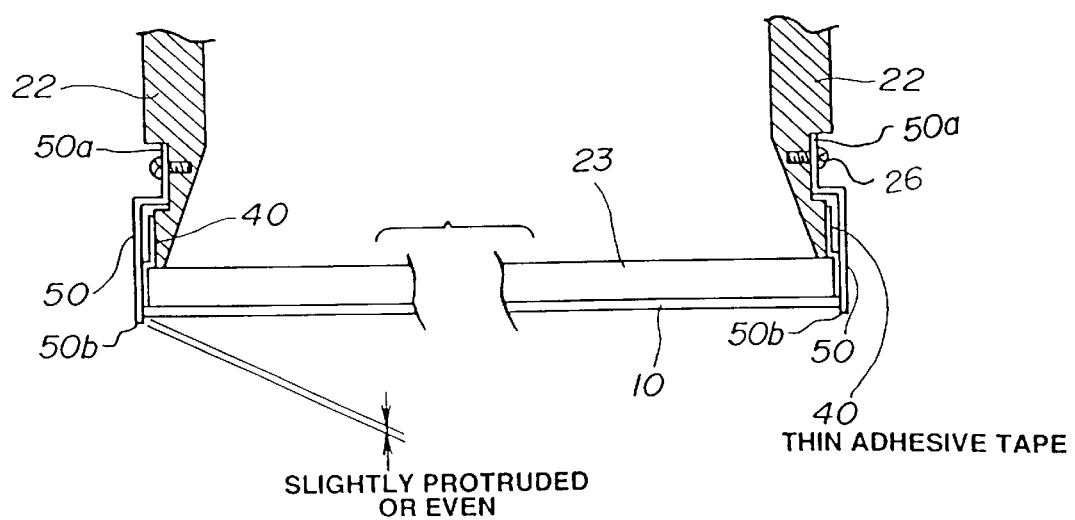
FIG. 12 is a view showing metal fittings provided on the outer periphery of a lenticular lens to form the unit displays of FIG. 11.

In order to shield light leaked from the cutting plane of the lenticular lens 10, metal fittings 50 are provided as shown in FIG. 12 to improve the quality of the picture. One end 50a of each of the metal fittings 50 are fired to outer periphery of the display unit and an opposite end 50b extends to a position slightly protruded beyond or even with a front surface of the lenticular lens 10. When forming a stereoscope according to said structure, in addition to the improvement of ends by making the arrangement of black stripes better (see FIG. 6(a)), it is possible to further prevent the light leaked from the cutting plane of the lenticular lens 10. Thus, in case of units 20 arranged in the horizontal direction or in a circular arc form, the quality of picture at the end of the lenticular lens is ensured. As it is not necessary to provide precise machining accuracy of the cutting plane at the end of the lenticular lens 10, there is an advantage that machining becomes easy and more cost-effective.

Next, referring to FIGS. 13 through 17, a screen fitting structure in a display unit using a comparatively large projecting screen will be described.

In the embodiments as shown in FIGS. 13 through 17, in order to control the bending of the screen and to make it possible to be used with a middle sized screen, a simpler attaching structure is presented. Here, a screen fitting structure is presented that applies force in the forward and backward direction of the screen.

Figure 13:
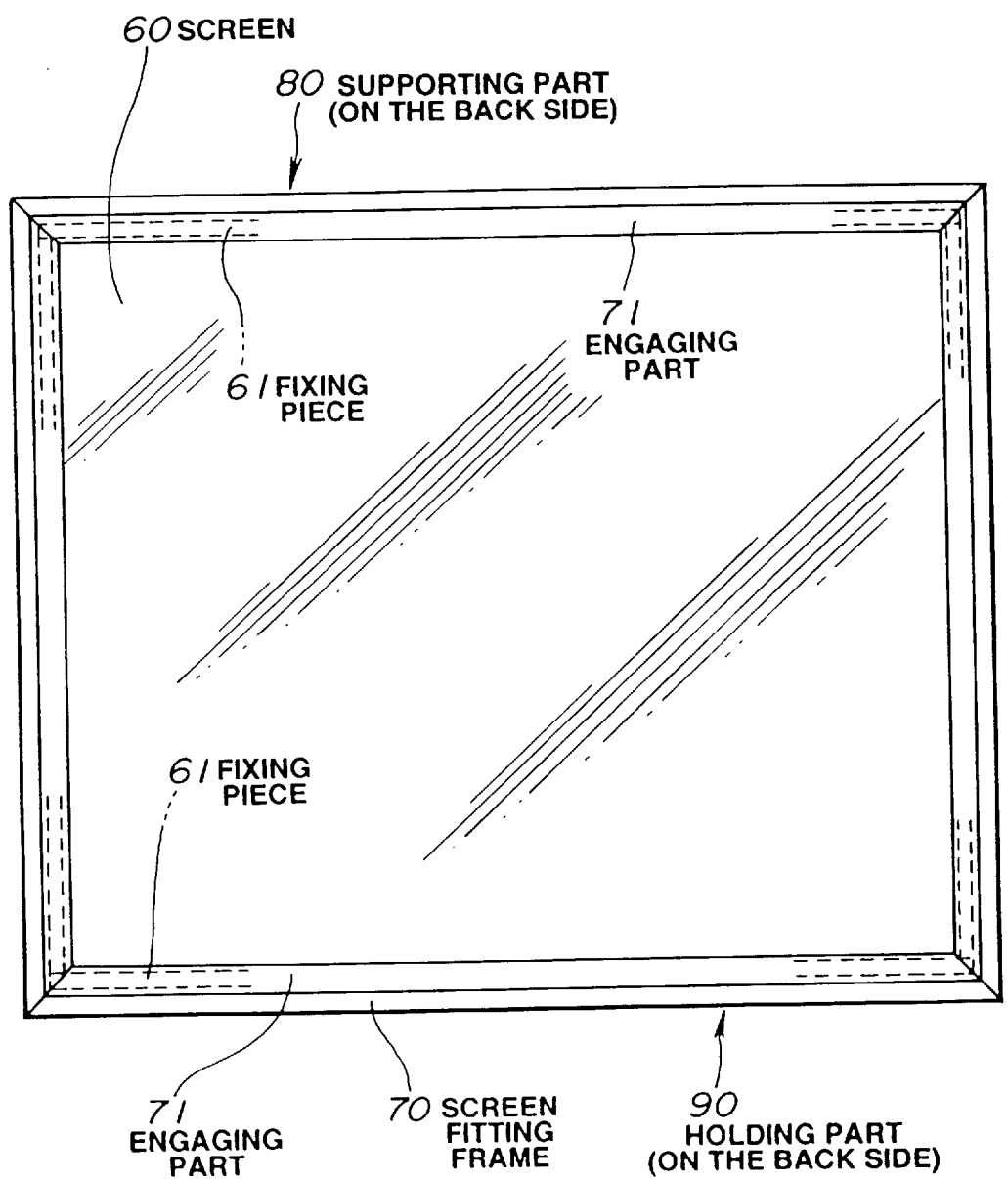
FIG. 13 is a view showing a screen fitting structure for a display unit according to the present invention.

First, the whole structure is described referring to FIG. 13. Next a supporting element or part 80 and a holding element or part 90 that are characteristic parts are explained referring to FIGS. 14 through 17.

Figure 14:
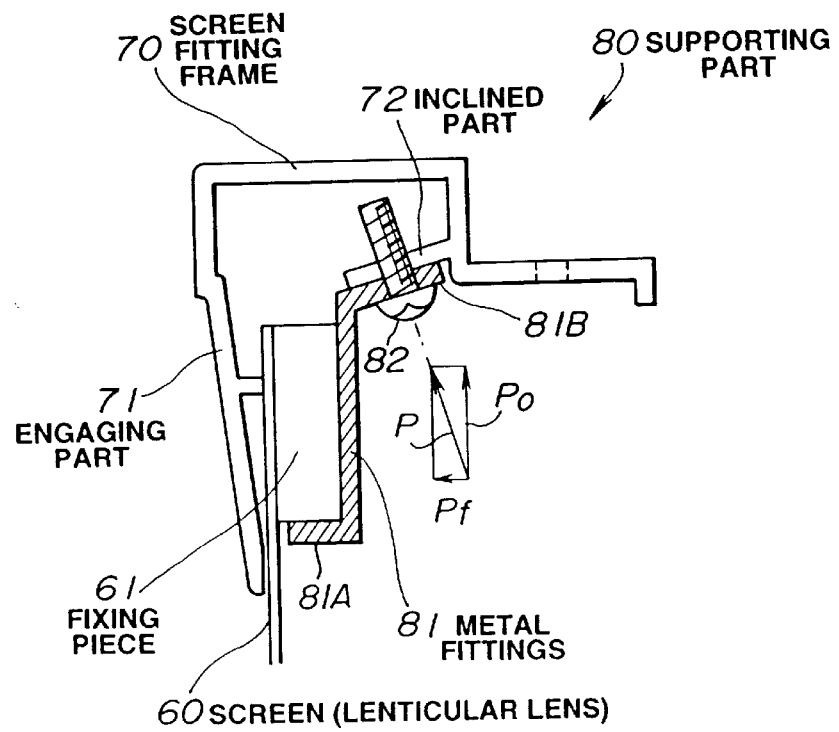
FIG. 14 is a cross section view showing a supporting part of FIG. 13.
Figure 16:
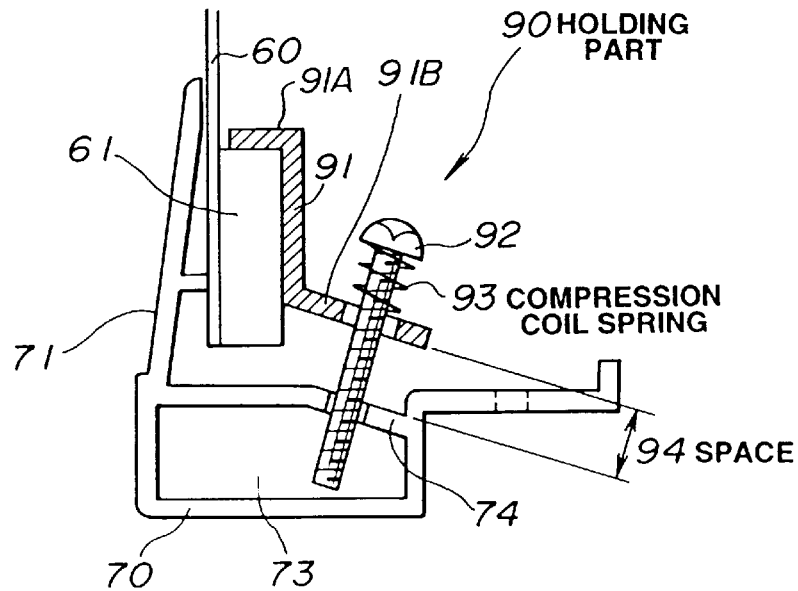
FIG. 16 is a cross section view showing a holding part of FIG. 13.

FIG. 13 is a front view of a projecting surface of a screen for a display unit related to the present invention. A fitting frame 70 having almost the same shape as the screen 60 and a large periphery part of the screen 60. The fitting frame 70 is provided with an engaging part 71 on the front of the screen and with inclined parts 72 and 74 on the back side of the screen as shown in FIGS. 14 and 16. The screen 60 is held by the engaging part 71 and metal fittings 81 and 91 fixed to the inclined parts 72 and 74. The supporting part 80 is disposed at the upper end of the fitting frame 70, and the holding part 90 is disposed at the lower end of the fitting frame 70. The metal fittings 81 and 91 are provided with inclined parts 81B and 91B. The inclined parts 81B and 91B are fixed to the inclined parts 72 and 74. The screen 60 is fixed to the fitting frame 70 by joining the metal fittings 81 and 91 to the fitting frame 70 by screws 82 and 92.

The fitting frame 70 is formed in a casing shape, a lower part thereof is fixed to a fixing stand. Therefore, it is possible to easily support and hold the screen by the supporting part 80 and the holding part 90 fixed to the fitting frame 70.

Here the structure of the supporting part 80 and the holding part 90 is described in detail. First, the structure of the supporting part 80 will be explained. A fixing piece 61 provided at the end of the screen 60 is supported by the fitting frame 70 and metal fittings 81. The end of the fixing piece 61 is supported by the L-shaped end 81A of the metal fittings 81. Another end 81B of the metal fittings 81 is fixed to an inclined part 72 of the fitting frame 70. The inclined part 72 is formed by the rib structure on the fitting frame 70. The inclined part 81B of the metal fittings 81 is fitted and fixed to the inclined part 72 by a screw 82. Inside a hole of the inclined part 72, an internal thread to be engaged with the screw 82 is provided.

By joining the inclined parts 72 and 81B by the screw 82, the supporting part 80 supports the screen 60 with application of upward force Pa to apply tension to the screen 60 and application of outward force Pf to push out and securely hold the screen 60.

Figure 15:
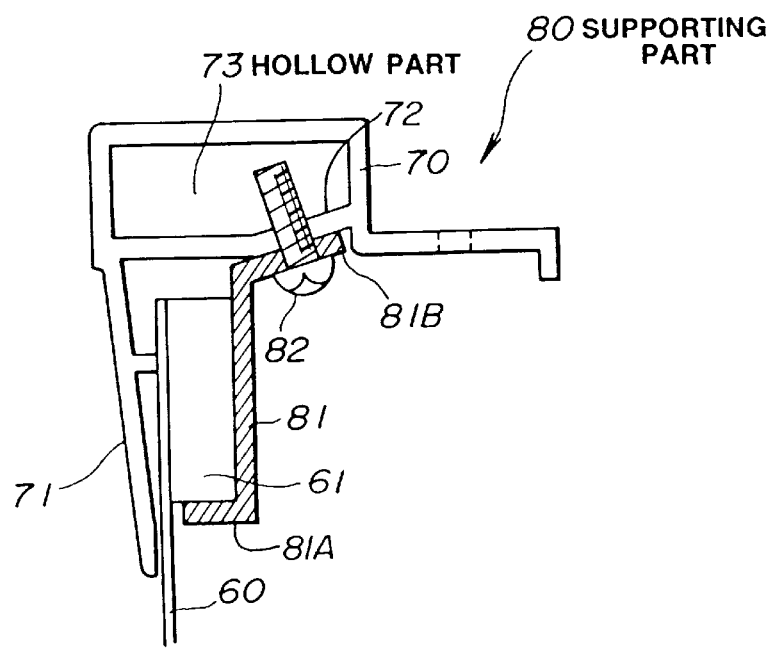
FIG. 15 is a cross section view showing a second embodiment of the supporting part of FIG. 13.

Though the inclined rib 72 is formed independently in FIG. 14, it is formed by providing a hollow part 73 on the fitting frame 70 in FIG. 15. This hollow part 73 provides the fitting frame 70 with additional strength.

Therefore, it is formed so that it is lightweight. Furthermore, because one can attach the screen by inserting the screw 82 into the hollow part 73 as shown in FIG. 15, it is possible to attach it without damaging appearance.

Next a holding part 90 is described referring to FIG. 16.

A holding part 90 is provided for attaching a screen 60 to the lower part of the fitting frame 70. Similarly, the holding part 90 is provided with a second inclined part 74. Here a second fixing piece 61 is provided at the lower part of the screen 60 is fixed to the second inclined part 74 by using the holding metal fittings 91 and the screw 92. Therefore, it is possible to hold the screen with application of downward tension and outward force to push out the screen 60. Furthermore, a spring 93 is preferably provided to apply proper tension.

Figure 17:
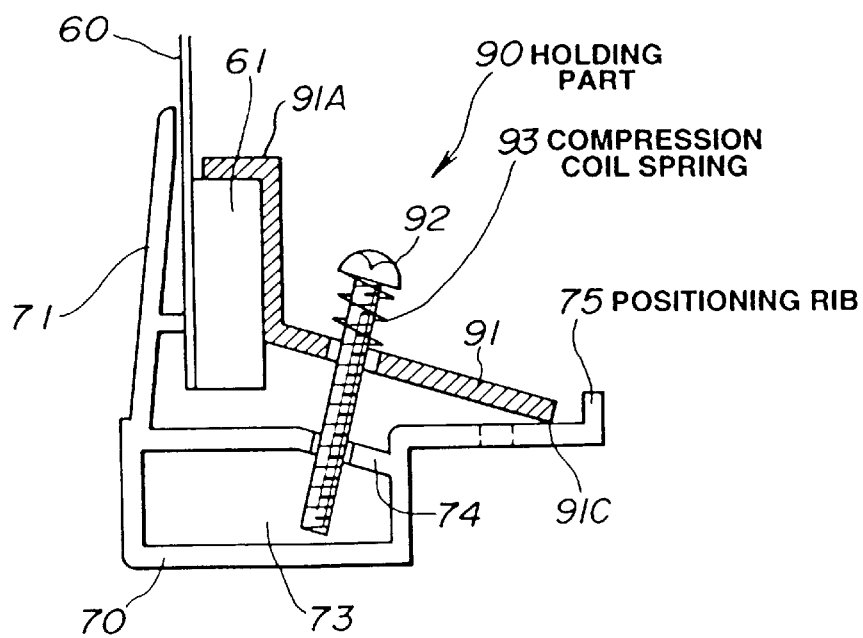
FIG. 17 is a cross section view showing a second embodiment of the holding part of FIG. 13.

Furthermore, a space 94 is provided to allow contraction of the screen 60. Therefore, it is possible to hold the screen 60 with application of proper tension to it together with a supporting part 80. Furthermore, it is possible to control the position of the lower end of the screen by the screw 92. Screw 92 and spring 93 function as the position control component. Additionally, as a space 94 is generated between the end of the metal fittings 91 and a fitting frame 1, the holding part 90 of the screen 60 may be somewhat unstable. FIG. 17 shows an improved embodiment.

In FIG. 17, instability of the holding metal fittings 91 is removed by providing a contacting part in the form of end 91C of the holding metal fittings 91. The contacting part 91C is formed by extending the end of the metal fittings that is fixed to the second inclined part 74. Thus, as the holding metal fittings 91 are fixed at both ends, stable holding is made possible. Furthermore, a rib 75 for positioning is provided at the fitting frame 70 so that the holding metal fittings 91 do not protrude from the fitting frame 70. Because such protruding may cause breaking, it is desirable to prevent such protrusion with a structure as shown in FIG. 17. Furthermore, it is possible to work easily and appearance is not damaged.

Here, a space is provided between the rib 75 for positioning and the end (contacting part) 91C. This part is provided to absorb the contraction of a screen 60. Therefore, the screen 60 and a fixing piece 61 are fixed securely without a space between the engaging part 71 and the supporting metal fittings 81 or the holding metal fittings 91. With such construction, it is possible to hold the screen easily.

It is also contemplated that a portion of the fitting from may be a hollow part 73. The use of the hollow part 73 allows the frame to be lightweight without losing any strength.

The present invention is not limited by said embodiments and it is possible to vary without departing from the spirit and the range of the present invention.

What is claimed is:

1. A multiscreen displaying apparatus comprising:

a plurality of display units, said display units being arranged adjacent one another to define a set of display units; a Fresnel lens mounted on a front side of each of said display units;

a lenticular lens disposed in covering relation with respect to said Fresnel lenses;

jaw parts connected to upper and lower ends of said set of display units and to said lenticular lens to hold said lenticular lens in said covering relation with respect to said Fresnel lenses of said display units; and springs inserted between said jaw parts and the upper and lower ends of said set of display units, said springs applying tension in a vertical direction to the lenticular lens.

2. The multiscreen displaying apparatus according to claim 1 further comprising:

a plurality of screws associated with said springs engaging each of said jaw parts with the upper and lower ends of said set of display units.

3. The multiscreen displaying apparatus according to claim 2 wherein each of said jaw parts comprises a center jaw part and two outer jaw parts on opposing sides of said center jaw part, at least one of said springs being associated with said outer jaw parts and at least one of said springs being associated with said center jaw part, said springs each having a spring constant;

the spring constant of said at least one spring associated with said outer jaw parts being greater than the spring constant of said at least one spring associated with the center jaw part.

4. The multiscreen displaying apparatus according to claim 3 wherein said center jaw part is longer than each of said outer jaw parts.

5. The multiscreen displaying apparatus according to claim 2, wherein said display units are arranged in a circular arc.

6. The multiscreen displaying apparatus according to claim 2, further comprising a protective layer covering a surface of said lenticular lens.

7. The multiscreen displaying apparatus according to claim 2, further comprising a connecting element connecting said Fresnel lenses to said display units.

8. The multiscreen displaying apparatus according to claim 7, wherein said connecting element is adhesive tape.

9. The multiscreen displaying apparatus according to claim 7, wherein said connecting element comprises a plurality of metal fittings, one end of each of said fittings being fixed to an outer periphery of each of said display units and an opposite end extending to a position slightly protruded beyond or even with a front surface of said lenticular lens.

10. The multiscreen displaying apparatus according to claim 1 further comprising a plurality of said sets of display units arranged in a circular arc.

11. The multiscreen displaying apparatus according to claim 1 further comprising a protective layer covering a surface of said lenticular lens.

12. The multiscreen displaying apparatus according to claim 1, further comprising a connecting element connecting said Fresnel lenses to said display units.

13. The multiscreen displaying apparatus according to claim 12 wherein said connecting element is adhesive tape.

14. The multiscreen displaying apparatus according to claim 12 wherein said connecting element comprises a plurality of metal fittings, one end of each of said metal fittings being fixed to an outer periphery of one of said display units and an opposite end extending to a position slightly potruded beyond or even with a front surface of said lenticular lens.

15. A multiscreen displaying apparatus comprising:

a plurality of sets of display units arranged adjacent one another, each of said sets of display units having a plurality of display units arranged adjacent one another;

a Fresnel lens mounted on a front side of each of said display units;

a lenticular lens mounted on each of said sets of display units in covering relation with respect to said Fresnel lenses of said displays units; and a plurality of black stripes provided on a front surface of each of said lenticular lenses and extending parallel to opposing edges of said front surface with one of said black stripes extending longitudinally and contiguously on each of said opposing edges of said front surface such that each of said sets of display units is partially shielded from external light.

16. A screen fitting structure for a display unit having a screen placed a predetermined distance from said display unit;

a fitting frame mounted on an outer periphery of said screen;

a supporting element attaching said screen to said fitting frame by applying tension in a first direction to said screen; and a holding element attaching said screen to said fitting frame by applying tension in a second direction opposite said first direction to said screen, said holding element including a position control component adapted to control an attaching position of said screen to said fitting frame.

17. The fitting structure according to claim 16 wherein said supporting element comprises:

a first fixing piece attached to a back surface of said screen, an engaging part provided on said fitting frame and extended so as to surround an outer periphery of a front surface of said screen, a first inclined part provided on said fitting frame and extended in an inclined manner towards said back surface of said screen, and a supporting member having a first end supporting said first fixing piece and a second end fixed to said first inclined part by a screw.

18. The fitting structure according to claim 16 wherein said holding element comprises;

a second fixing piece attached to a back surface of said screen, an engaging part provided on said fitting frame and extended so as to surround an outer periphery of a front surface of said screen, a second inclined part provided on said fitting frame and extended in an inclined manner toward said back surface of said screen, a holding member having a first end supporting said second fixing piece and a second end fixed to said second inclined part, and a screw associated with a spring fixing said holding member to said second inclined part.

19. The screen fitting structure according to claim 18, wherein said holding member comprises a contacting part contacting said fitting frame, said contacting part being an extension of the second end fixed to said second inclined part.

20. The screen fitting structure according to claims 17 or 15, wherein a portion of said fitting frame surrounding the outer periphery of said screen is hollow.

* * * * *